Jan. 4, 1938. J. HAMBECK 2,104,256
PICTURE STAND
Filed Dec. 9, 1935 2 Sheets-Sheet 1

INVENTOR
Joseph Hambeck
BY
ATTORNEY

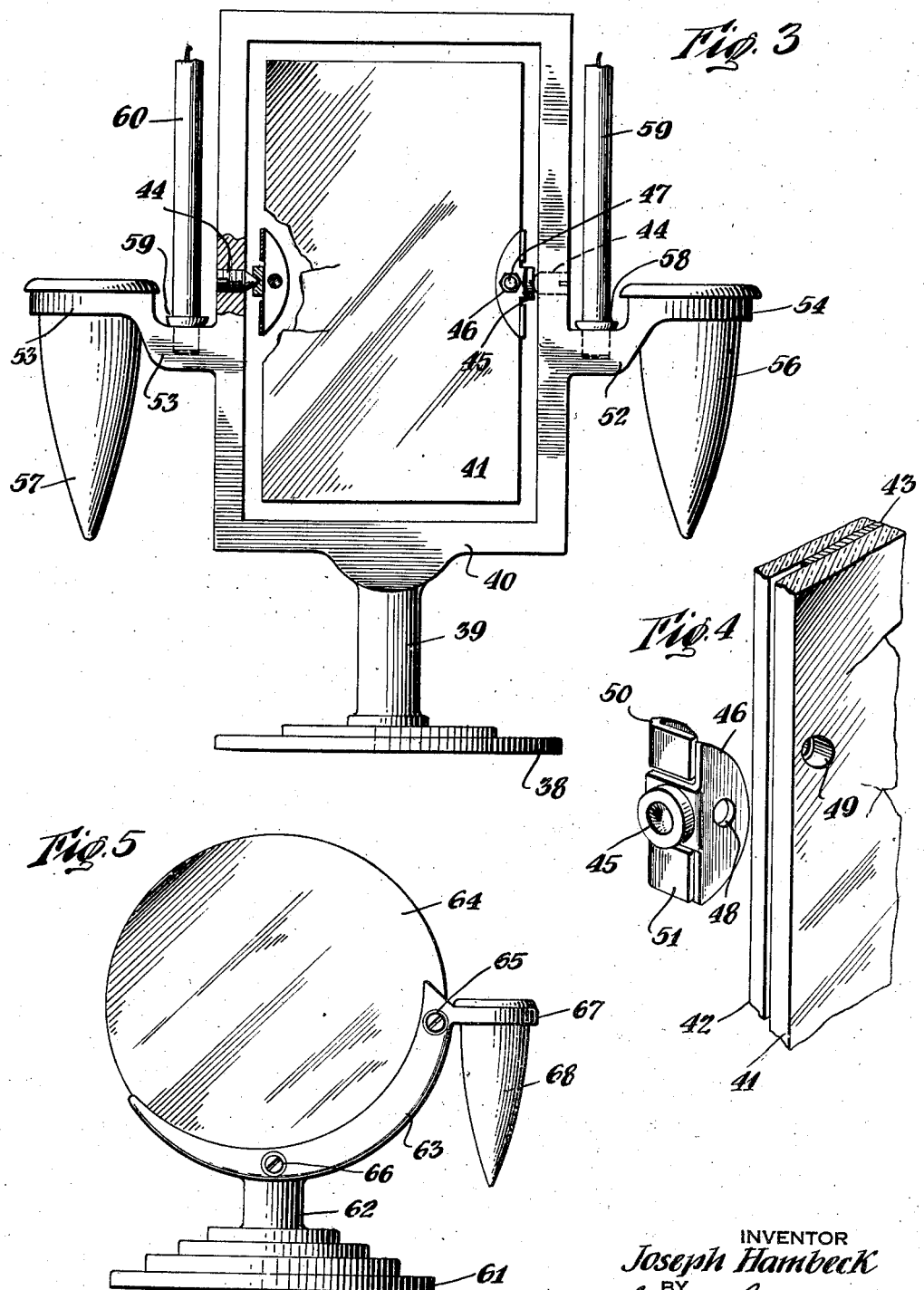

Patented Jan. 4, 1938

2,104,256

UNITED STATES PATENT OFFICE 2,104,256

PICTURE STAND

Joseph Hambeck, New York, N. Y.

Application December 9, 1935, Serial No. 53,564

1 Claim. (Cl. 40—152.1)

This invention relates to improvements in picture stands, and it is the principal object of my invention to provide a picture stand of pleasing and decorous appearance in which a picture is exchangeably held between two glass plates secured in a frame which has turnably attached thereto a plurality of flower vases and which supports lamps to suitably illuminate the picture.

Another object of my invention is the provision of a picture stand or similar device, the frame of which is formed with a hollow base in which a switch controlled battery is located to furnish current to the lamps which however may also be illuminated from a house circuit to which they are suitably connected.

A further object of my invention is the provision of a picture stand in which the picture holding frame or glass plates are rotatably supported in a suitable frame having exchangeably supported flower vases on its sides, and sockets for the reception of candlesticks or the like.

A still further object of my invention is the provision of a picture stand or the like in which the picture is held between two circular glass plates supported by a frame formed on the arc of a circle and equipped with a flower vase and suitable pedestal.

Still another object of my invention is the provision of novel and improved means to securely hold the glass plates in place with the picture between them and presenting sockets into which engage the conically shaped ends of pivot screws or the like to rotatably support the glass plates within a frame. It will be clear that the glass plates and the picture may also be replaced by a mirror or the like article.

These and other objects and advantages of my invention will become more fully known as the description thereof proceeds, and will then be specifically defined in the appended claim.

In the accompanying drawings forming a material part of this disclosure:

Fig. 3 is a front elevation of a modified form of the picture stand.

Fig. 4 illustrates in perspective views the clamps for the glass plates and sockets for the pivot pins of the frame.

Fig. 5 is a front elevation of a further modification of my invention.

Figure 1:
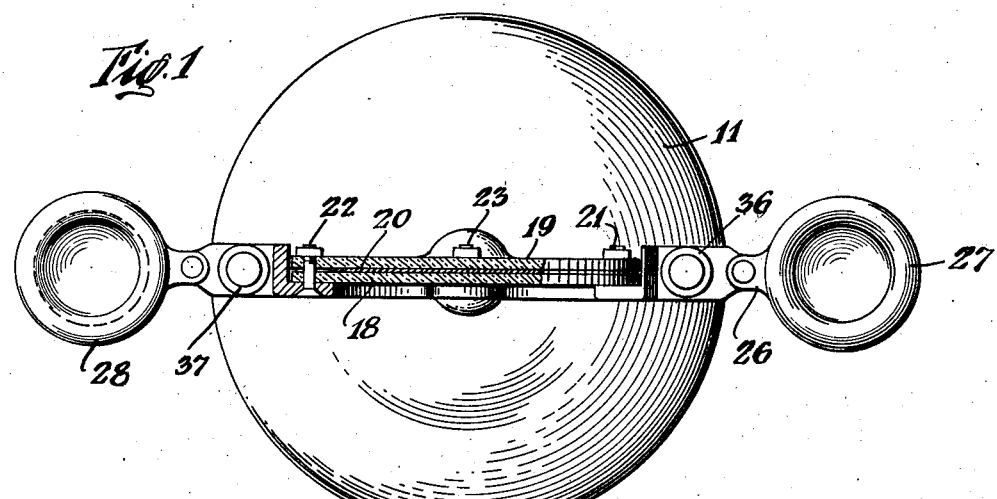
Fig. 1 is a top plan view of a picture stand constructed according to my invention, seen along line 1—1 of Figure 2, partly in section.
Figure 2:
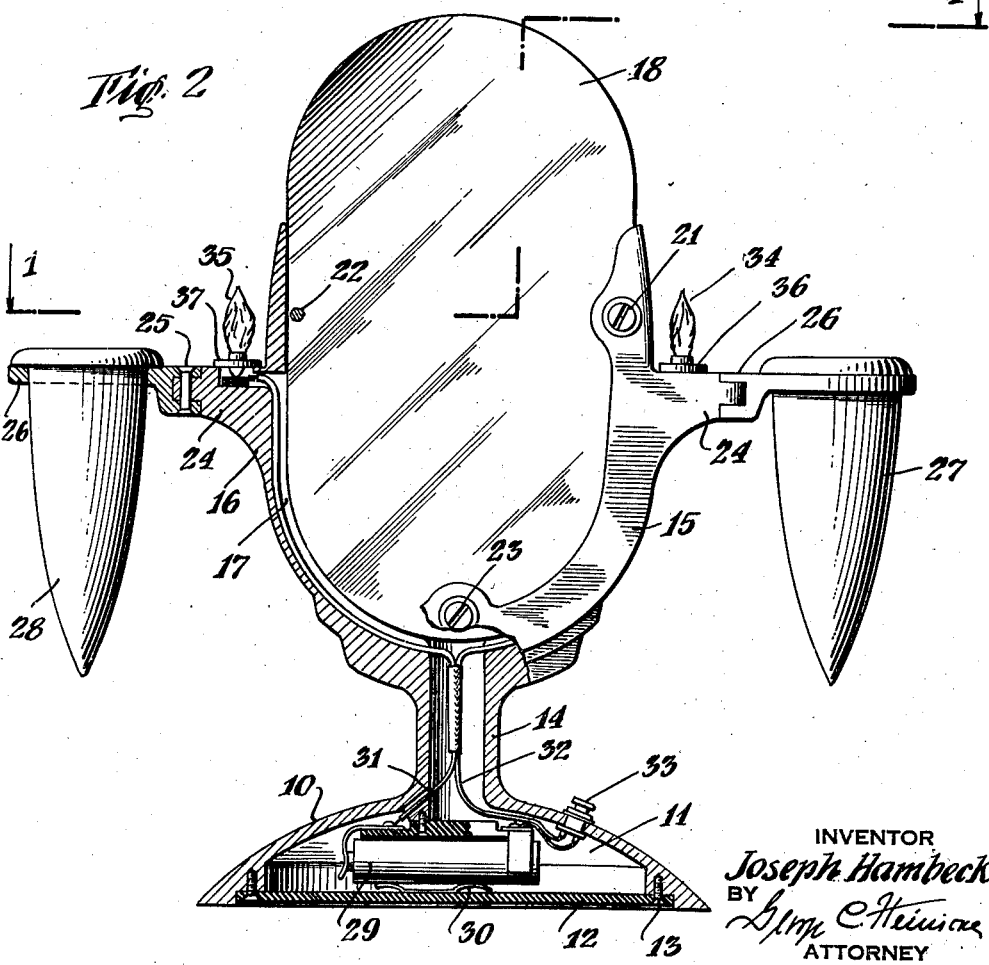
Fig. 2 is a front elevation thereof, partly in section.

As illustrated in Figures 1 and 2, a base 10 of any suitable material, color or shape, has formed therein a chamber 11 closed at the bottom by means of a plate 12 which is secured to the base by means of the screws 13 or the like.

Formed in one piece with the base 10 is a stand or frame having a neck part 14 and frame members 15, 16 L-shaped in cross-section having an inner groove or channel 17 and extending from the neck part upwardly and laterally in opposite directions, suitably curved to present a pleasing appearance.

The channel 17 of the frame is adapted to receive and hold the lower portion of two glass plates 18, 19 between which the picture 20 is held, and which are held in place by means of the fastening means or screws 21, 22, and 23.

The frame members 15 and 16 have laterally extending brackets 24 formed therewith to which are turnably attached by means of the bolts 25, the inner ends of suitably shaped brackets 26 forming at their outer ends rings for the exchangeable support of the suitably flanged flower vases 27 and 28.

A dry battery 29 is held within the chamber 11 of the base by means of the spring metal members 30, and the cables 31, 32 attached to the poles of the battery and a contact button or switch 33 lead within the channel of the frame members to the miniature electric lamps 34, 35 in sockets 36, 37 formed in the frame.

As illustrated in Figures 3 and 4, the stand has a suitably shaped base 38 with which are integrally formed the post or standard 39 and frame 40. In the opening of the frame are suspended the glass plates 41, 42 between which the picture 43 is held, and which are connected by means of the conically pointed set screws 44 in approximately the middle of the frame's side bars engaging in sockets 45 of the clips or clamp members 46 engaging the front and rear faces of the glass plates, and held together and in place by means of the screws 47 or the like passed through openings 48 in the clamp members and 49 in the glass plates. Members 50 and 51 serve to compensate for the thickness of the picture.

The frame 40 has laterally extending brackets 52, 53 with which are formed the ring members 54, 55 from which are removably suspended by means of their marginal flanges, the flower vases 56, 57. Sockets 58 are formed in the arms of the brackets 52, 53 for the reception of the lower ends of the candlesticks 59, 60.

In the form of my invention illustrated in Figure 5, the base 61 has formed therewith a vertical post 62 which carries a frame 63 having an inner channel for the reception of a pair of substantially circular glass plates 64 holding the picture between them and which are connected by means of the screws 65, 66. The frame has a laterally extending branch or bracket 67 formed therewith having substantially ring-shape and from which is suspended by means of its upper marginal flange a flower vase 68.

It will be understood that I have disclosed the preferred forms of my invention only as a few examples of the many possible ways to practically construct the same, and that I may make such changes in the general arrangement of the picture stand and in the construction of its minor details as come within the scope of the appended claim without departure from the spirit of my invention, so for instance I can make the frame detachable from its base and provide a highly polished or mirrored upper face for the base to cast reflecting rays upon the frame and picture therein greatly contributing to its embellishment through the light effects produced by the reflector. Furthermore, I may dispense with the use of the dry battery and connect the lamps directly with a house circuit.

Having thus described my invention, what I claim as new, and desire to secure by Letters Patent is:

In a combined picture stand and flower holder, a base, a frame, a neck connecting the frame with the base, means for holding a picture within the frame, laterally extending brackets formed with said frame, and holders for flowers turnably attached by means of pivot bolts to said brackets at one end, and rings formed with said holders at their other, outer ends for the suspension of flower vases, said holders adapted to be turned about their pivot bolts to flank the picture in approximately the front thereof, lamp-sockets formed with said frame brackets for the support of lamps of a size sufficient to illuminate the flowers in said vases, and means for connecting said lamps to a source of electricity.

JOSEPH HAMBECK.